Aug. 4, 1942. P. W. ENSIGN Re. 22,151

PRESSURE REGULATOR

Original Filed Dec. 12, 1939

Inventor.
Paul W. Ensign.

McCaleb & Lane Hebury

Attorneys.

Reissued Aug. 4, 1942

Re. 22,151

UNITED STATES PATENT OFFICE 22,151

PRESSURE REGULATOR

Paul W. Ensign, San Marino, Calif., assignor to Ensign Carburetor Co. Ltd., Huntington Park, Calif., a corporation of California Original No. 2,280,390, dated April 21, 1942, Serial No. 308,804, December 12, 1939. Application for reissue June 8, 1942, Serial No. 446,256

15 Claims. (Cl. 137—153)

This invention relates to pressure regulators, and has for its general object the simplification and reduction in cost of certain parts of fluid pressure regulators.

In pressure regulators of the type to which this invention particularly relates, a pressure regulating valve is commonly actuated and controlled by some pressure movable member such as a diaphragm. The diaphragm or other member may be subjected to various forces, such as spring pressures or fluid pressures. But, whatever those various forces may be, one side of the diaphragm is subjected to pressure, modified or unmodified, from the low pressure or outlet side of the regulating valve, that side of the diaphragm being commonly called the low pressure side.

For many uses and purposes it is not desirable to have a wide open communication between the low pressure side of the diaphragm and the low pressure side of the regulating valve, but on the other hand, a restricted communication so that pulsations or sudden changes in the outlet pressure will not set up pulsations in the diaphragm, and so also that the controlling pressure at the low pressure side of the diaphragm may be modified if desired by pressures from any desired modifying source.

In the past various arrangements have been used for isolating the low pressure side of the diaphragm from the low pressure side of the regulating valve. For instance, a valve rod may pass through the wall or walls between the low pressure diaphragm chamber and the low pressure outlet chamber at the outlet side of the valve and the rod either be packed with a packing gland or be closely fitted to the bore through which it passes. That valve rod may carry the regulating valve directly and may also be directly connected to the actuating diaphragm. In cases where it is desired to set up a mechanical advantage between the valve and the diaphragm, levers are also usually used, connecting between the diaphragm and the valve rod or between the valve rod and the valve.

It is an object of this invention to provide a simple construction whereby the interconnection between the diaphragm and regulating valve may if desired consist substantially wholly of a simple lever, still maintaining the desired isolation; and this object is accomplished by providing a lever mounting of such nature that the lever may pass through the wall separating the two low pressure chambers, and whereby the intercommunication between the two chambers is controllably restricted.

The invention will be best understood from the following detailed description of a specific and illustrative design as applied to a typical pressure regulator, reference for the purpose being had to the accompanying drawing in which Fig. 1 is a central section showing my improvement applied to a typical pressure regulator;

Figure 1:
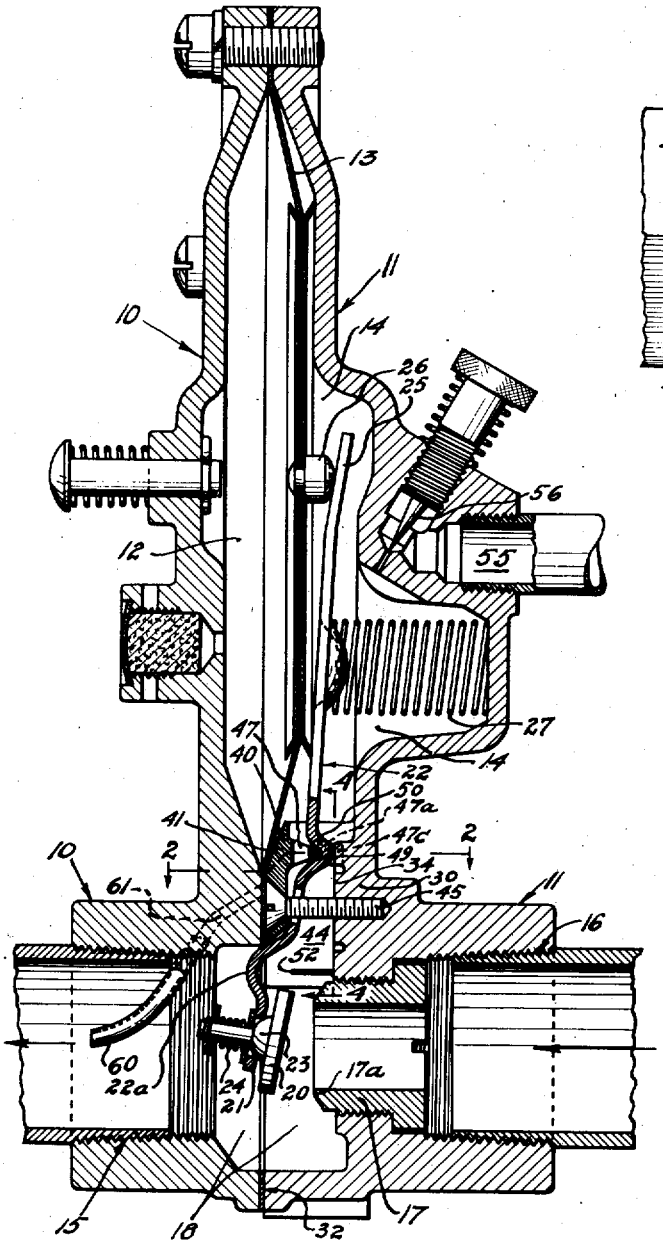

The typical regulator shown in the drawing is made up mainly of two castings 10 and 11 which contain, respectively, the reference pressure chamber 12 at one side of diaphragm 13, and the low pressure chamber 14 at the other side of the diaphragm. The casting 10 also includes the low pressure outlet 15, and casting 11 includes the high pressure inlet 16 which is provided with the inserted valve seat member 17. The chamber 18, which is formed in registering parts of the two castings, is a low pressure outlet chamber communicating with the outlet 15, and for the purposes of this description may either be regarded as a low pressure valve chamber or as a part of the low pressure outlet chamber at the outlet side of the valve.

The valve 20 as here shown is a simple disk valve mounted on the end portion 21 of valve lever 22, the mounting including a spheric seat 23 and a spring 24 that provide freedom for the valve to adjust itself in good contact with the valve seat 17*a*.

Diaphragm 13 is clamped peripherally between the two castings 10 and 11, and the valve lever 22 is located at the low pressure side of diaphragm 13 with its end 25 contacting or connected with diaphragm 13 in any suitable manner. It is here shown simply engaging a button 26 carried on the diaphragm, a spring 27 bearing against lever 22 with sufficient force to make the lever end 25 follow the diaphragm and to move valve 20 onto its seat against the high pressure in inlet 16.

As here shown, diaphragm 13 is adapted to have fluid pressure applied in chamber 12, but any means for applying the reference pressure may be used. The pressure in low pressure chamber 14 may be modified in any desired manner or by any suitable means. For instance a pressure connection at 55, controlled by valve 56, may serve to transmit a modifying pressure. Reference is made to Ensign Patents 2,073,298 and 2,073,299 illustrating typical uses of reference and modifying pressures. Further, the pressure at the low side of the diaphragm may be further modified to relatively decrease that pressure as velocities through outlet 15 become higher, by use of a Pitot tube 60 which faces down-stream and connects via passages 61 and 62 with chamber 14.

Figure 2:
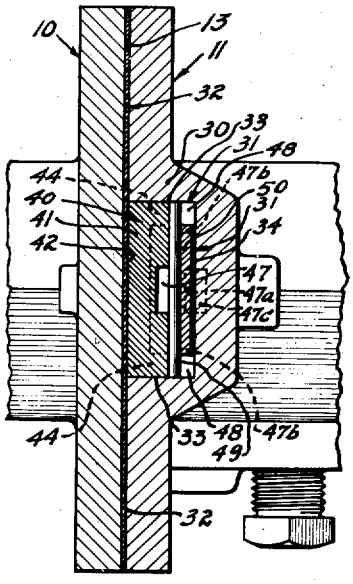
Fig. 2 is a section on line 2—2 of Fig. 1.
Figure 3:
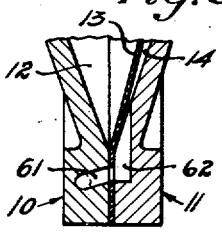
Fig. 3 is a fragmentary section taken in a plane parallel to the section plane of Fig. 1.

The typical regulator here shown has been designed to deliver fuel gas at substantially atmospheric, but modified pressures to the carbureter or mixer of an internal combustion engine, but my invention is applicable generally to pressure regulators regardless of their design, their uses or the pressures involved.

Where the lever 22 passes between low pressure outlet chamber 18 and low pressure diaphragm chamber 14, the wall 30 of casting 11 which would otherwise completely isolate chambers 14 and 18, is cut through with an opening 31 that is here shown as of rectangular section as viewed in Fig. 2. This rectangular opening is cut back from the face 32 of casing 11 that engages the face of diaphragm 13, and is defined in the casting 11 by the two side walls 33 and what may be called the bottom wall 34.

The rectangular opening just described is blocked, excepting as hereinafter described, by a block 40 which provides a simple fulcrum for the valve lever 22 and also provides in one manner or another the controllably restricted communication between low pressure outlet chamber 18 and low pressure diaphragm chamber 14. In the specific and illustrative design here shown, the block 40 is generally of U-shaped or channel section having a web 41 which presents a flat surface 42 (see Fig. 2) flush with the diaphragm engaging surface 32 of casting 11, to bear against the peripheral portion of the diaphragm. The block has two longitudinally extending flanges 44 at its lateral edges, the outer surfaces of these flanges fitting snugly against side walls 33 of opening 31, and the edges of the flanges resting against the bottom wall 34 of that opening. The block is held in place in casting 11 by the screw 45.

Figure 4:
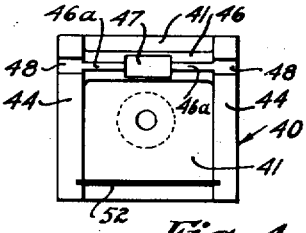
Fig. 4 is a face view of the block which provides the pivot for the valve lever, this view being taken as indicated by line 4 on Fig. 1.

Extending between the two flanges 44 the block has a transverse rib 46 which may be provided in its outer edge with a notch 47 constituting the major portion of the controllably restricted communication between the two low pressure chambers 14 and 18. This notch may be made of any size desired. In line with the rib 46 the two flanges 44 are notched as shown at 48 to take the transverse pivot pin 49; and this pivot pin rests against the ends of notches 48 and also against the edge of rib 46. In machining or otherwise finishing the notches 48 to their proper depth, the machining operation may be carried across the outer edge of rib 46 to form the edge surface 50 (see Fig. 4) so that the pivot pin 49 will bear snugly throughout its length against the edge surface 46a and the bottoms of notches 48.

Rib 46 and pivot pin 49, as thus assembled, constitute a convenient and simple arrangement for forming at once as barrier member across the opening through block 40 and a pivot fulcrum for valve lever 22 with an inserted piece (pivot pin 49) of good bearing material for which stock steel or other rod may be used. The use of the separate pin 49 also facilitates cutting the opening 47 as a notch.

In the broader aspects of my invention pivot pin 49 may be regarded as a part of the fulcrum rib 46; and the rib 46 and the whole block 40 may be regarded as a part of the casing or framework of the regulator. However, the pivot structure and assembly shown here has the stated advantages; and the provision of the separate block 40, carrying the parts that controllably block the passage and that form the lever pivot, has the advantage of providing a small insertible part that is easily machined and a sub-assembly that is easily assembled and then put in place.

Lever 22 is shown as formed simply of a strip of metal of rectangular cross-section, with a bearing portion 50 bent substantially to semi-cylindric form to bear against and fit around pivot pin 49. At this portion 50 the lever is just thick enough to snugly but movably fit against the surface 34, or to leave a small definite clearance. The width of lever 22 at the bearing portion 50 is such as to fit snugly but movably, or with slight clearance, between block flanges 44. At other parts of its length the lever need not fit closely in the space between the flanges, its end portions may taper down from the center. The rib 46, pivot pin 49 and the bearing portion 50 of the lever, together form the barrier across the space between the block flanges 44. This barrier, as so constituted, has two fluid passages past it; one of those passages being the clearance space or spaces which is desirable around the lever bearing portion 50, the other being the notch 47 which is most conveniently formed in the rib (40) portion of the barrier. The clearance passage may be easily made small enough to be of less cross-sectional area than the total communication area desired between chambers 14 and 18. The remainder of the total desired communication area is then easily and accurately provided by making notch 47 of the proper size. Or, where the total desired communication area is small it may be constituted solely of the clearance spaces around the lever, without making the lever too loosely mounted.

A baffle 52 extends transversely between flanges 44 to break or divert the high velocity flow that might otherwise stream directly from under valve 20 toward the restricted passages leading to chamber 14. To make this baffle of suitable width, lever 22 is curved at 22a to accommodate it. The arm 21 of lever 22, more or less extending across the space between the flanges 44 and positioned between valve seat 17a and communication notch 47, also acts as a baffle to protect opening 47 against direct flow from the valve.

In conjunction with, or without, the communication opening at 47, other calibrated openings may be used. For instance the bearing portion 50 of the lever may be notched through as shown at 47a. It may not be desirable that the clearance between lever part 50 and wall surface 34 be made large enough to provide all the desired communication, as the lever would then be undesirably loose on its pivot; but the desired communication may be partially or substantially wholly provided by making greater clearance at the edge or edges of the lever 22 at its bearing part 50, as indicated at 47b in Fig. 2. Or a groove or grooves 47c may be cut in wall 34 under the bearing part 50 for the same purpose.

I claim:

1. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first-mentioned communication being independent of the second mentioned communication; a unitary pivoted valve lever connected at one end with the valve, extending through the communication passage and connected at the other end with the diaphragm, and a barrier member extending across said passage and forming a pivot within said passage for the valve lever, said barrier and lever together forming an obstruction which nearly fills the cross-section of the passage and thereby provides a restricted communication between the outlet chamber and the diaphragm chamber so that the outlet pressure is restrictedly communicated to the diaphragm chamber.

2. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first-mentioned communication being independent of the second mentioned communication; a unitary pivoted valve lever connected at one end with the valve, extending through the communication passage and connected at the other end with the diaphragm, a barrier member extending across said passage and forming a pivot within said passage for the valve lever, said barrier and lever together forming an obstruction which substantially fills the cross-section of the passage, and means in association with the barrier member and the valve lever forming a restricted passageway past the barrier member so that the outlet pressure is restrictedly communicated to the diaphragm chamber.

3. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a barrier member extending across said passage and extending from a passage wall toward and having a free fulcrum edge spaced from the wall opposite, the valve lever passing through and substantially filling the space between said fulcrum edge and said wall opposite and being pivoted on said fulcrum edge.

4. In a pressure regulator of the type having a pressure movable diaphragm, a low pressure chamber at one side of the diaphragm, a high pressure inlet including a valve seat, a low pressure outlet chamber, valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a barrier member extending across said passage and extending from a passage wall toward and having a free fulcrum edge spaced from the wall opposite, the valve lever passing through and substantially filling the space between said fulcrum edge and said wall opposite and being pivoted on said fulcrum edge, said barrier member and the valve lever together forming a substantially complete barrier across said passage, and means in association with said barrier forming a restricted passage past it.

5. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a barrier member extending across said passage and extending from a passage wall toward and having a free fulcrum edge spaced from the wall opposite, the valve lever passing through and substantially filling the space between said fulcrum edge and said wall opposite and being pivoted on said fulcrum edge, and a restricted opening through the barrier member.

6. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a barrier member extending across said passage and extending from a passage wall toward and having a free fulcrum edge spaced from the wall opposite, the valve lever passing through and substantially filling the space between said fulcrum edge and said wall opposite and being pivoted on said fulcrum edge, and a transverse baffle across the passage located between the valve seat and the barrier member.

7. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a barrier member extending across said passage and extending from a passage wall toward and having a free fulcrum edge spaced from the wall opposite, the valve lever passing through and substantially filling the space between said fulcrum edge and said wall opposite and being pivoted on said fulcrum edge, a restricted opening through the barrier member, and the valve connected end portion of the valve lever lying between the valve seat and said restricted opening.

8. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a removable pivot and barrier block fitting said passage, said block being channel shaped and comprised of a web and two lateral flanges whose free edges contact one wall of said passage, a barrier member extending across the space between the two flanges and projecting from the web toward said wall and having a free fulcrum edge spaced from said wall, and the valve lever passing through and substantially filling the space between said fulcrum edge and said wall and pivoted on said fulcrum edge.

9. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a removable pivot and barrier block fitting said passage, said block being channel shaped and comprised of a web and two lateral flanges whose free edges contact one wall of said passage, a barrier member extending across the space between the two flanges and projecting from the web toward said wall and having a free fulcrum edge spaced from said wall, and the valve lever passing through and substantially filling the space between said fulcrum edge and said wall and pivoted on said fulcrum edge, said barrier member and the valve lever together forming a substantially complete barrier across the space between the block web and said wall and between said block flanges, and means in association with said barrier forming a restricted passage past it.

10. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a removable pivot and barrier block fitting said passage, said block being channel shaped and comprised of a web and two lateral flanges whose free edges contact one wall of said passage, a barrier member extending across the space between the two flanges and projecting from the web toward said wall and having a free fulcrum edge spaced from said wall, and the valve lever passing through and substantially filling the space between said fulcrum edge and said wall and pivoted on said fulcrum edge, said barrier member having a restricted opening through it.

11. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber; a unitary pivoted valve lever connected at one end with the valve, extending through the communication passage and connected at the other end with the diaphragm, a removable pivot and barrier block fitting said passage, said block being channel shaped and comprised of a web and two lateral flanges whose free edges contact one wall of said passage, a barrier member extending across the space between the two flanges and projecting from the web toward said wall and having a free fulcrum edge spaced from said wall, and the valve lever passing through and substantially filling the space between said fulcrum edge and said wall and pivoted on said fulcrum edge, said barrier member having a restricted opening through it, a transverse baffle extending between the block flanges and located between the valve seat and the barrier member and valve lever, and the valve connected end portion of the valve lever lying between the valve seat and the opening through the barrier member.

12. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first mentioned communication being independent of the second mentioned communication; a unitary pivoted valve lever connected at one end with the valve, extending through the communication passage and connected at the other end with the diaphragm, a barrier member extending across said passage and forming a pivot within said passage for the valve lever, said barrier and lever together forming an obstruction which nearly fills the cross-section of the passage and thereby provides a restricted communication between the outlet chamber and the diaphragm chamber so that the outlet pressure is restrictedly communicated to the diaphragm chamber, and means independent of said restricted communication for regulatedly communicating another fluid pressure to the diaphragm chamber to modify the pressure therein.

13. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first mentioned communication being independent of the second mentioned communication; a unitary pivoted valve lever connected at one end with the valve, extending through the communication passage and connected at the other end with the diaphragm, a barrier member extending across said passage and forming a pivot within said passage for the valve lever, said barrier and lever together forming an obstruction which substantially fills the cross-section of the passage, means in association with the barrier member and the valve lever forming a restricted passageway past the barrier member so that the outlet pressure is restrictedly communicated to the diaphragm chamber, and means independent of said restricted communication for regulatedly communicating another fluid pressure to the diaphragm chamber to modify the pressure therein.

14. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first mentioned communication being independent of the second mentioned communication; a unitary pivoted valve lever connected at one end with the valve, extending through the communication passage and connected at the other end with the diaphragm, a member located in said communication passage and providing therein a pivot upon which a medial portion of the lever is pivotally mounted within the passage, the said member and the pivoted portion of the lever together forming an obstruction which nearly fills the cross-section of the passage leaving a restricted passageway which is located substantially solely directly adjacent the pivoted portion of the lever.

15. In a pressure regulator of the type having a pressure movable diaphragm, a low pressure chamber at one side of the diaphragm, a high pressure inlet including a valve seat, a low pressure outlet chamber valvularly communicating with the inlet, a valve, and a communication passage between the low pressure diaphragm chamber and the outlet chamber, the first mentioned communication being independent of the second mentioned communication; a unitary pivoted valve lever connected at one end with the valve, extending through the communication passage and connected at the other end with the diaphragm, a barrier member located in said communication passage, extending across the passage from a passage wall toward and having a pivot member spaced from the wall opposite, a medial portion of the valve lever within the passage being pivotally mounted on the pivot member and having a clearance from the opposite wall, which clearance forms a restricted passageway past the barrier.

PAUL W. ENSIGN.